Figure 1:
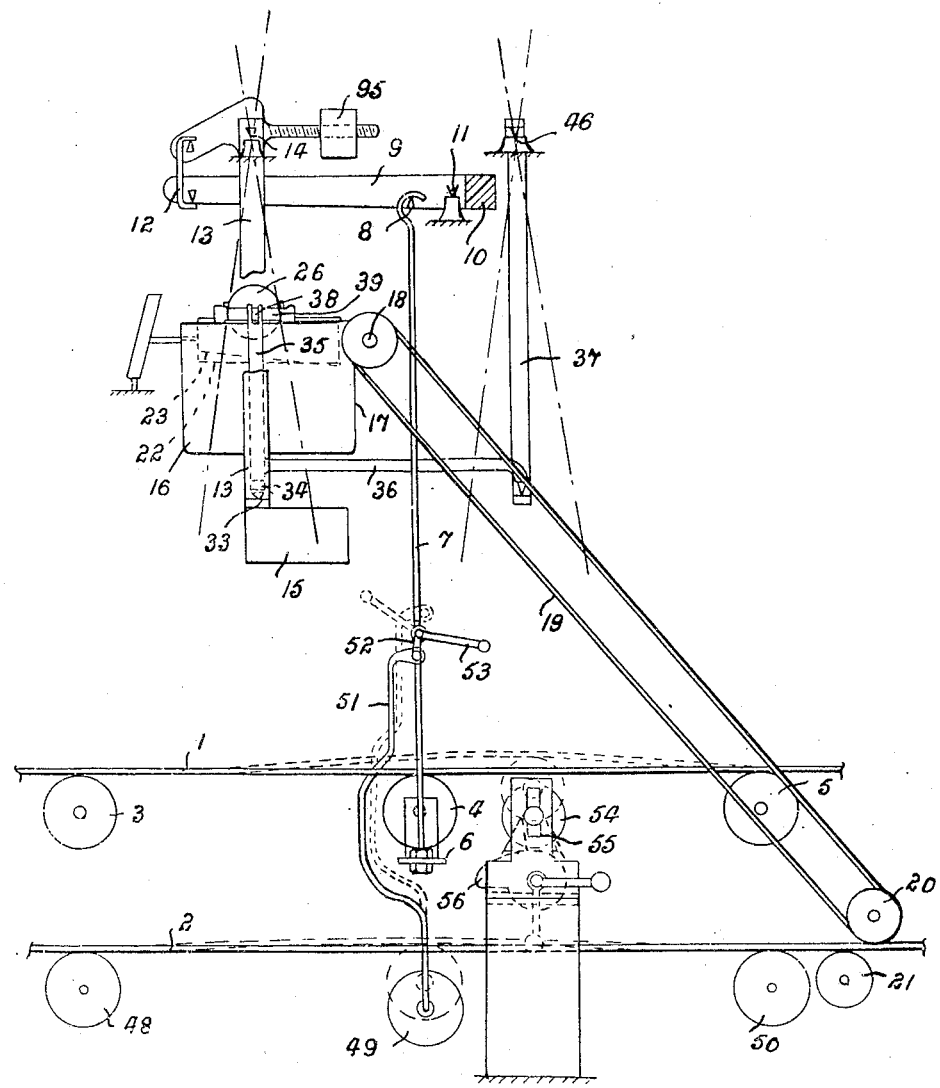

Nov. 22, 1949  S. C. BROWN  2,488,760
WEIGHT INTEGRATOR
Filed Dec. 20, 1945  5 Sheets-Sheet 1

INVENTOR
SIDNEY CHARLES BROWN
BY *Otto Funk*
HIS ATTY

Nov. 22, 1949     S. C. BROWN     2,488,760
WEIGHT INTEGRATOR

Filed Dec. 20, 1945     5 Sheets-Sheet 2

INVENTOR
SIDNEY CHARLES BROWN

Nov. 22, 1949 S. C. BROWN 2,488,760
WEIGHT INTEGRATOR
Filed Dec. 20, 1945 5 Sheets-Sheet 3

INVENTOR
SIDNEY CHARLES BROWN
BY Otto Munk
HIS ATTY

Nov. 22, 1949  S. C. BROWN  2,488,760
WEIGHT INTEGRATOR
Filed Dec. 20, 1945  5 Sheets-Sheet 4

INVENTOR
SIDNEY CHARLES BROWN
BY Otto Munk
HIS ATTY

Nov. 22, 1949 — S. C. BROWN — 2,488,760
WEIGHT INTEGRATOR
Filed Dec. 20, 1945 — 5 Sheets-Sheet 5
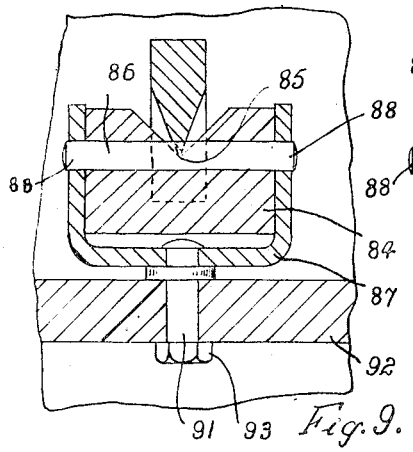
Fig. 9.
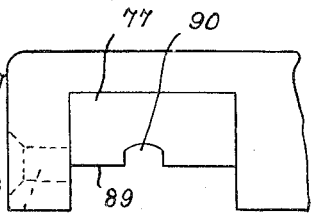
Fig. 10.
Fig. 11.
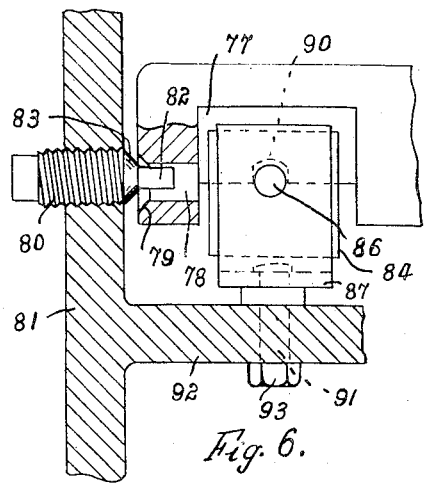
Fig. 6.
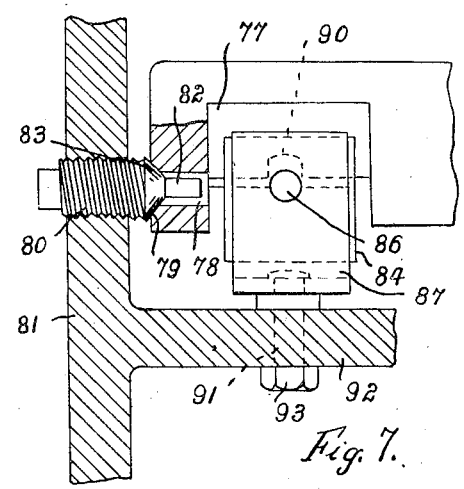
Fig. 7.
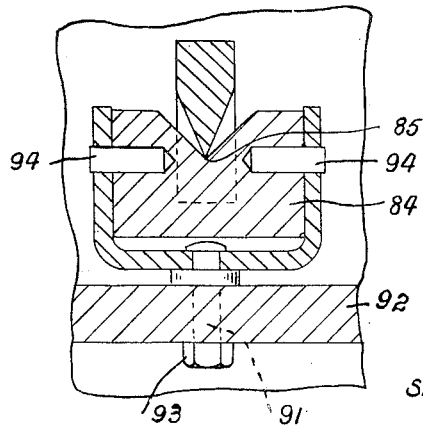
Fig. 8.
INVENTOR
SIDNEY CHARLES BROWN
BY Otto Munk
HIS ATTY Patented Nov. 22, 1949

2,488,760

UNITED STATES PATENT OFFICE 2,488,760

WEIGHT INTEGRATOR

Sidney Charles Brown, Petersham, England

Application December 20, 1945, Serial No. 636,157
In Great Britain January 15, 1945

4 Claims. (Cl. 235—61)

This invention relates to apparatus for automatically integrating, totalising and recording the weight of materials moved continuously e. g. by endless flexible conveyors such as belts, linked buckets and the like or intermittently e. g. by a succession of trucks or vehicles, and in particular to apparatus of the kind in which the relationship between the speeds of rotatable members comprising parallel and conical members controlled through the transitional movements of a ball in rolling frictional engagement between them is made responsive to the weight of material on a selected part of the conveyor at any time or to the weight of a vehicle moving over a weigh-bridge, or other weight responsive element, said parallel and conical rollers being coupled through differential gearing with movable indicating means affording a record of the weight of materials conveyed. Such an apparatus is described in my United States Patent No. 2,134,298.

The object of the invention is an improved construction of apparatus of this type offering a high degree of reliability and accuracy of weight measurement in operation and adapted to maintain accuracy for long periods with a minimum of attention and servicing.

In accordance with the invention apparatus of the kind indicated above is provided wherein movements of the weight responsive element are transmitted to adjust the frictional transmission means through an articulated parallelogram extending from above to below the friction gear and adapted to make angular movements directly proportional in extent to the movements of the weight responsive element, and means carried by the lower member of the parallelogram so as to be moved thereby parallel to itself and extending upwards therefrom and into engagement with the frictional transmission means, whereby a substantially linear relationship is obtained between the movements of the weight responsive element and the displacement of the frictional transmission means.

The parallelogram or parts thereof may be of appropriate mass to form a pendulum functioning as resistant but it is to be understood that alternative means such as a spring or means involving fluid displacement may be employed for this purpose.

The frictionally coupled rotating members may comprise at least one parallel cylindrical roller and one conical roller journalled in spaced relationship and the movable frictional transmission member is a ball, the means carried by the lower member of the parallelogram for moving the ball consisting of an upwardly projecting post and a yoke supported thereby and embracing the ball.

In the preferred arrangement the yoke carries a pair of co-axial disc wheels the opposed faces of which form flat surfaces for rolling engagement with a circumferential line on the ball.

The parallel roller is rotated at a speed in fixed relationship with that of the conveyor and is geared with the planet cage of a differential gear, while the conical roller is geared with the planetary system of the differential gear, the output sun wheel being adapted to drive the recording part of a weight-integrating indicator the arrangement being such that when the angular speeds of the two rollers are equal the output sun wheel is stationary.

Figure 2:
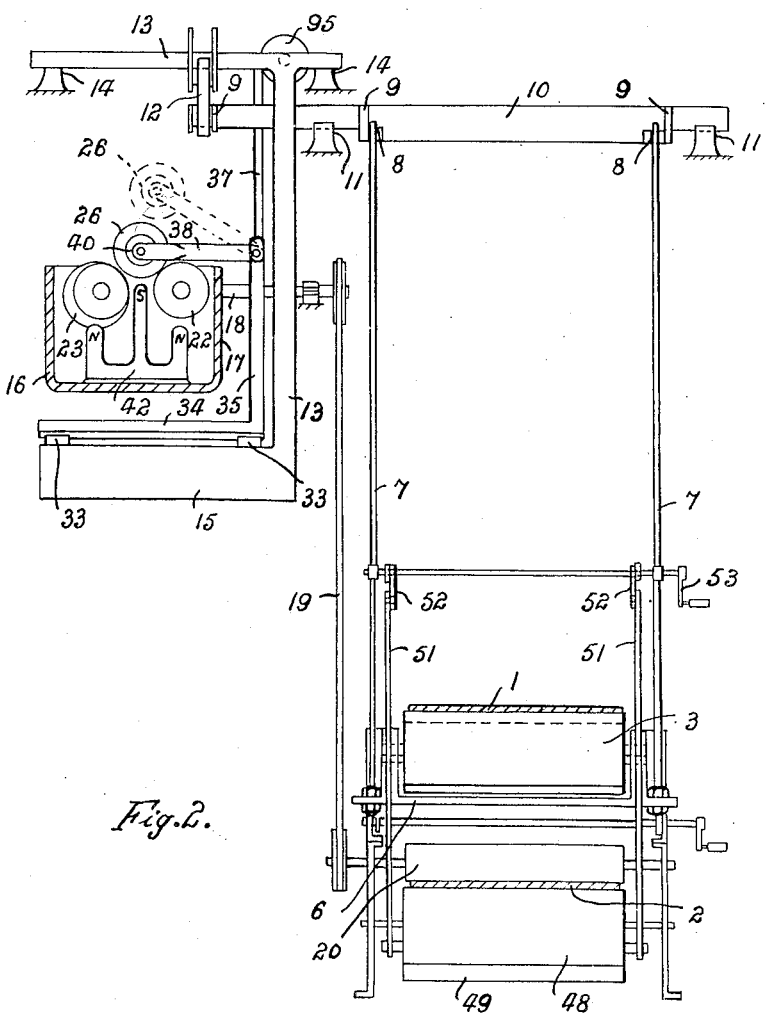
Figure 3:
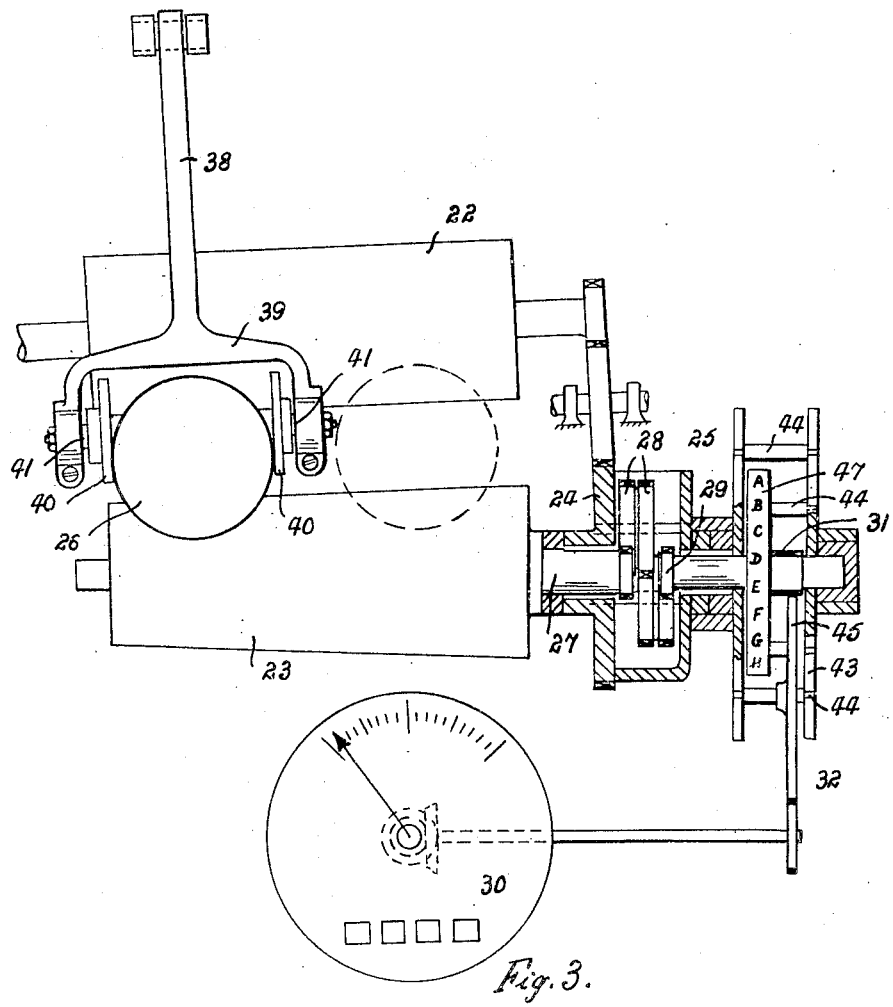
Figures 4, 5:
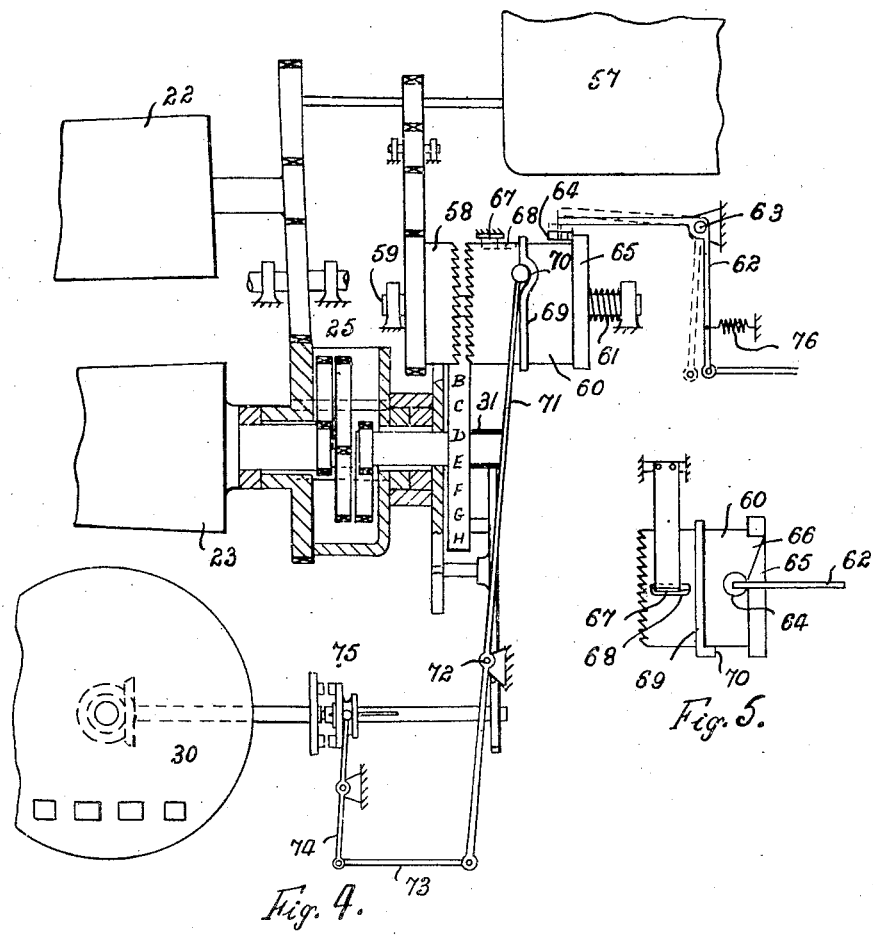

One embodiment of the invention as applied to an endless belt conveyor is illustrated by way of example in the accompanying drawing in which Fig. 1 is a view in side elevation showing the general arrangement, Fig. 2 is an end elevational view partly in section taken from the left hand side of Fig. 1, Fig. 3 is a view in plan and on a larger scale of the frictional gear and the means for coupling it with the integrating indicator, Fig. 4 is a view on the lines of Fig. 3 but illustrating means for integrating and totalising intermittently fed loads e. g. a succession of trucks. Fig. 5 shows a detail plan of a part of Fig. 4.

Figs. 6 and 7 are views in section of the form of knife-edge bearing with retaining means as used with the apparatus according to the invention and Figs. 8 to 11 are detail views illustrating the construction of the knife-edge bearings permitting and ensuring self-alignment.

The apparatus illustrated is adapted to be carried on a supporting frame structure (not shown) usually of angle iron and sheet metal and adapted to straddle or bridge the conveyor belt, being fixedly mounted on the conveyor frame or other convenient fixed support.

In the drawings (Figs. 1 and 2) the upper or loaded strand of the conveyor belt is indicated by 1 and the lower or idle strand by 2.

Three preferably equally spaced idler rollers 3, 4 and 5 in continuous contact with the underside of the loaded strand 1 of the conveyor belt are selected, and of these, the intermediate roller 4 is mounted on a weighing system, to rise and fall and to take position according to the weight of material on the section of the conveyor between rollers 3 and 5. The weighting system comprises a platform 6 which carries the central weighing idler 4, said platform extending between, and being attached to the lower ends of a pair of rods 7 depending one on each side of the upper strand 1 of the conveyor belt and shackled at their upper ends as shown at 8 to the arms 9 of a parallel armed weigh beam 10 mounted on knife edges 11. The arms 9 of the weigh beam 10 extend in the general lengthwise direction of the conveyor belt and the free end of one arm is shackled at 12 to a bell cranked lever 13 mounted on knife-edge bearings 14 and carrying a pendulum weight 15. This pendulum forms the resistant.

Movements of the pendulum 15 may be transmitted by any convenient means to give a transitory indication on a scale (not shown) graduated for hourly feed rate.

The integrating mechanism operating under the influence of the rocking movements of the main beam 10 is as follows:

Within the frame of the machine is mounted a box-like structure 16 Figs. 1 and 2 on one end wall 17 of which are provided bearings for a driving shaft 18 which is driven by a chain 19 from a roller 20 in rolling contact with the idle strand 2 of the conveyor belt or from a part of the belt driving mechanism, so that the rotation of said shaft 18 is always in synchronism with the rate of travel of the belt surface.

An idler roller 21 may be provided beneath the idle strand close to roller 20 to ensure driving engagement of the latter with the conveyor.

Within the box are also mounted a pair of rollers 22 and 23 disposed with their axes transverse with regard to the driving shaft 18, the roller 22 being of parallel cylindrical form and the roller 23 conical.

The parallel cylindrical roller 22 is driven e. g. through bevel, mitre or chain gearing from the driving shaft 18, so that its speed is always related to that of the conveyor and the shaft of said parallel roller 22 is geared (Fig. 3) with a two to one ratio with the planet cage 24 of a differential gear designated generally by 25. The conical roller 23 is friction driven by a ball 26 arranged to rotate in frictional contact with both the parallel and conical rollers 22 and 23.

The axes of the parallel and conical rollers 22 and 23 are so disposed relative to one another that the lines of contact of the ball 26 with the two surfaces thereof are parallel and also horizontal, so that on the one hand the angular distance between the points of engagement on the surface of the ball 26 remains constant and on the other hand gravitational effect of the weight of the ball does not influence weighing.

For this purpose the axis of the conical roller 23 diverges from that of the parallel roller 22 in the direction towards the large end of the cone in plan as shown in Fig. 3, and furthermore is uptilted in elevation in the direction towards the small end of the cone, both deviations being about the neutral or zero point of the ball 26, i. e. when the ball is in the position corresponding to a 1:1 transmission ratio. Both rollers 22 and 23, and preferably also the ball 26, at said neutral point are of equal diameter so that the points of contact are on a line at approximately half the height of the triangle of centres.

The shaft 27 (Fig. 3) of the conical roller 23 is directly geared with the planet pinions 28 e. g. a two pinion system of the differential gear 25 and the arrangement is such that when the parallel and conical rollers are rotating at the same angular speed, the shaft of output sun wheel 29 is stationary. The output sun wheel 29 of the differential when rotated, drives the indicating part of the weight-integrating indicator 30 from a pinion 31 on the sun wheel spindle through a suitable gear train 32.

The above described arrangement of differential gear coupling offers the advantage of low inertia and momentum on the variable-speed output member.

It will readily be seen that the ratio of angular speed of rotation between the parallel and conical rollers 22 and 23 will be varied as the driving ball 26 is moved longitudinally along the valley between them and means are provided to cause said ball to make such movements in relationship with the rocking movements of the previously described weighing system.

For this purpose an articulated parallelogram is provided of which, in the case illustrated the previously described pendulum comprising the vertical arm of bell crank 13 and the weight 15 form part. The weight 15 forms a platform and on knife-edge bearings 33 on this platform is mounted one arm of a bell crank member 34 the other arm 35 of which forms an upwardly extending post. From the member 34 extends a rigidly connected horizontal arm 36 pivotally connected at its end to a link 37 parallel and of equal length to the vertical arm of bell crank 13 and pivoted on knife edges 40 at its upper end.

The vertical arm of bell crank 13 and link 37 are of a length to extend below the friction gear to minimise the vertical component of movement of the platform 15 as much as possible and all the component parts of the parallelogram are connected or mounted in an anti-friction manner e. g. by knife-edge bearings as shown.

The post 35 extends upwardly at the back of the box-like structure 16 and at its upper end carries a hinged arm 38 the free end of which extends into the box 16 and is provided on its extremity with a yoke 39 embracing the driving ball 26. This embracing yoke carries a pair of co-axial disc wheels 40 the opposed faces of which form flat annular surfaces for rolling engagement with a circumferential line on the ball 26. The discs 40 are mounted on anti-friction bearings on spindles 41 and the spindles are adjustable in the ends of the arms of the yoke 39 to permit back-lash or lost motion of the ball to be eliminated.

In operation the swinging movements of the platform 15 and the connection between arm 36 and link 37 cause the upstanding post 35 to move parallel to itself and the yoke 39 to make traversing movements, together with the ball 26, in the general direction of the axes of the parallel and conical rollers 22 and 23 frictionally coupled by said ball.

The arrangement described ensures that the ball 26 is always engaged at diametrically opposed points by the rotary discs 40 on the yoke 39 despite the slight up and down movement of the post 35 carrying the yoked arm 38. The arrangement so far described constitutes a compounding or multiplying lever system between the load and the ball permitting a linear relationship between the deflections or rocking movements of the main weigh beam 10 and the displacement of the ball in the friction gear to be achieved.

The parallel and conical rollers 22 and 23 are preferably formed as tubular bodies of relatively large diameter preferably of hard steel of high permeability, the outer surfaces being for example electro-plated with nickel or chromium, while the ball 26 is preferably of stainless steel and less hard than the rollers, and this makes for ease of replacement and reconditioning of the parts.

The frictional engagement of the ball 26 with the rollers is augmented by the use of magnetic means urging the ball against the rollers, an arrangement which also provides a dashpot or damping effect of sensitive definition.

This arrangement may consist of two or more magnets 42 placed with poles close beneath the respective parallel and conical rollers, and if necessary as in the case shown in Fig. 2 beneath the ball also, so that the magnetic circuit is completed through the ball and the latter drawn firmly towards the rollers.

The magnets are however disposed in such manner as to avoid any bias on the ball resulting from a tendency to take a position of magnetic balance and thereby preventing it from taking a true weight integrating position.

The box-like casing 16 enclosing the friction gear comprising the two rollers 22, 23, ball 26 and yoke 39 may be provided with a protective lid (not shown), and easy cleaning of the parts made possible, since, when the lid is raised the hinged yoke arm 38 may be lifted about its pivot at the top of the post 35 and the ball 26 lifted out without the necessity for any disassembling operation. A hand operated lever device may be provided to facilitate removal of the ball against the magnetic pull.

It will be noted that for the purpose of ensuring sensitive definition the weighing parts wherever possible are mounted for movement on knife-edge bearings.

For the purpose of enabling the rate or scale of measurement on the integrating indicator 30 to be varied to suit different capacity weighers, provision is made for variation of the gearing between the sun wheel 29 of the differential and the moving member of the indicator. For example on the casing of the indicator or differential 25 may be mounted a readily detachable spider 43 axially disposed with regard to the spindle of sun wheel 29 and carrying pins or studs 44 forming bearings for pinions 45 the number and dimensions of which can be selected as desired to form the train 32 between the sun wheel output pinion 31 of the differential and the moving part of the indicator.

When the apparatus is in use and there is no material being fed by the moving conveyor, the position of the weighing system and therefore also the ball 26 should be such that the conical roller 23 is driven by the ball at the same angular speed as that of the parallel roller 22 in which circumstances the output sun wheel 29 of the differential and consequently the moving part of the integrating indicator, would remain stationary. It will be understood that the weighing system may be out of balance either plus or minus and this will be revealed by the rotation of the sun wheel output shaft in one direction or the other.

An alphabetically lettered wheel 47 is provided mounted upon the sun output shaft, so that any slight to or fro movement of a sighted letter can be quickly observed. This would otherwise not be so readily discernible at the recorder due to the intervening high gear train.

Correction or adjustment to the zero position may be effected by a hand operated screw balance weight 95 or the like mounted on the pendulum 13.

In cases where the conveyor is continually loaded means are provided to enable zero balancing of the weighing apparatus to be carried out from time to time.

For this purpose there are provided or selected three idler rollers 48, 49 and 50 beneath the lower or idle run 2 of the belt, spaced apart by distances corresponding to those between rollers 3, 4 and 5 under the upper run 1. The intermediate roller 49 is permanently shackled through a toggle linkage 51, 52 to the rods 7 supporting the weight responsive roller 4 under the upper run 1 of the belt and during normal working this lower intermediate roller 49 is in a lowered position out of contact from the belt as shown in full lines in Fig. 1. A handle 53 enables the toggle linkage 51, 52 and the coupling between the intermediate rollers 4 and 49 to be shortened at any moment to raise the lower roller 49 into a position shown in dotted lines in Fig. 1, where it carries a length of the lower run 2 equivalent to the weighed length of upper run.

A further auxiliary roller 54 is mounted for rising and falling movements in guides 55 beneath the upper run 1 of the belt under the control of a hand operated cam 56. This roller 54 which is normally in the lowered position shown in full lines is raised by cam 56 to the dotted line position in which it lifts the upper run 1 of the belt from engagement with the upper intermediate roller 4.

The balance check is taken by subjecting the main weigh beam through the normal transmission, to the load of an empty section of belt in the lower run which is the equivalent of the normally functioning length of belt in the upper run.

In cases of fast running belts a stretch of loaded belt strand 1 between more than three selected idler rollers may be made use of for the purposes of the weighing apparatus according to the invention, and more than one intermediate roller may be mounted on the weight responsive platform 6 between said selected idlers.

When the apparatus is required to integrate and totalise intermittently e. g. when used to register in respect of a train of railway trucks, means are provided to maintain the weight recorder 30 uncoupled from the output member 31 of the differential until a truck arrives on the weigh-bridge or other moving weight responsive element.

For this purpose a clutch may be provided between the differential and the weight indicator 30 and means such as a "one revolution" detent wheel provided to throw in this clutch permitting the indicator to be driven appropriately for each successive truck to be weighed.

Means for this purpose is illustrated in Figs. 4 and 5.

The parallel roller 22 of the integrator is in this case driven continuously from a constant speed motor or other power source 57 and is also geared with an appropriate selected ratio to a clutch element 58 fixed on a spindle 59 on which the other clutch element 60 forming a detent wheel is mounted to slide under the urge of a spring 61 to put in the clutch. A cranked lever 62 is pivoted at 63 and at one end carries a roller 64 adapted to engage on one side of a cam rim 65 on clutch element 60 to retain the latter in the disengaged position as shown. By rocking lever 62 momentarily about its pivot 63 the roller 64 is raised as shown in dotted lines in Fig. 4 and the clutch element 60 permitted to engage clutch element 58 and to be rotated thereby. During such rotation the roller 64 rides upon the cam rim 65 until a wedge recess 66 in the cam (Fig. 5) comes opposite the roller 64 whereupon the latter is permitted to resume its former position and the clutch element 60 is withdrawn against spring 61 to the clutch disengaged position.

The arrangement is such that clutch element or detent wheel 60 makes exactly one complete revolution each time the clutch is engaged. A spring biased detent 67 is provided for engagement in a notch 68 in the periphery of the element 60 to fix the rest position of the latter with precision.

The clutch element 60 bears a second peripheral cam rim 69 having a single dwell 70, and this cam rim 60 controls the movements of a rocking lever 71 pivoted at 72 and connected by a link 73 with the control lever 74 of a dog clutch 75 provided in the transmission between the differential output 31 and the indicator.

Rocking of crank lever 62 is momentarily effected by means of any convenient form of trip or trigger (not shown) operated against a return spring 76, as each truck moves on to the weight responsive member, and it will readily be seen that as each truck moves into the weighing position, the weight integrating recorder 30 is always driven by the differential 25 during one complete revolution of the detent wheel 60 which as indicated above is related to the rotation of the parallel roller 22 of the integrator by the selected ratio of transmission between that roller and clutch element 58.

For the purpose of ensuring sensitive definition the weighing parts wherever possible are mounted for movement on knife-edge bearings and it is desirable for the purpose of preventing the knife edges from becoming displaced from their bearings and damaged, in particular during transhipment and erection of the apparatus, to provide retaining means therefor.

In accordance with a further feature of the invention the improved weight integrating and recording apparatus embodies knife-edge bearings having means for locking the knife-edge members of the bearings against movement or for preventing the knife-edge members from becoming unshipped or displaced during normal operation. The invention still further consists in an improved weight integrating and recording apparatus having knife-edge bearings which are self-aligning when the bearing elements are brought together.

Referring to the drawings (Figs. 6 and 7) the knife-edge member 77 is provided with a hole 78 in axial alignment with the knife edge or apex line of the V in the block, the outer end of the hole being countersunk as shown at 79. Into this hole projects the end of a screw 80 secured in a fixed part 81 of the frame structure. The screw is provided with a reduced end 82 and the junction of the screw body and the reduced end is of conical form as shown at 83 corresponding to the countersunk end 79 of the hole 78. The screw 80 is mounted in the fixed part 81 so as to extend eccentrically of the hole 78 when the bearing is operating normally but the clearance between the reduced end 82 of the screw and the walls of the hole 78 is such as to avoid any contact between these parts during normal operation. Any untoward movement between the parts liable to upset or damage the knife edge is prevented.

By tightening the screw 78 the coned portion 83 is brought into engagement with the countersunk end 79 of the hole 78 with the result that the knife-edge member 77 is raised from engagement with the bearing block as shown in Fig. 7 and locked in this position for transport and erection on the site.

The bearings are constructed so that when the screw is released the knife edge returns into effective properly aligned contact with the bearing blocks.

To ensure self-alignment the bearings are constructed as follows.

The bearing block 84 is provided with the usual V groove 85 (Figs. 8–11) and mid-way along the V is formed a hole through the block into which is driven a hardened steel parallel pin 86 the ends of which extend beyond the opposite side of the block. The centre line of the pin 86 intersects the apex line of the V groove 85 and is at right angles to the median plane thereof.

A U-shaped stirrup 87 embraces the bearing block 84 from below but is clear of said block and the limbs of the stirrup are drilled to receive the ends 88 of the pin 86 without play but so as to be rotatable therein so that the V block can pivot about the axis of the pin 86 to make full contact with the edge 89 of the knife-edge member 77 resting upon it, subject to the edge 89 being shaped to accommodate that part of pin 86 in the V-groove. For this purpose the edge 89 is grooved or notched as shown at 90 in Fig. 11 the shape and dimensions being such that only point contact is made between notch 90 and the pin 86 at points co-axial with the knife line.

Thus longitudinal movement or end play between the knife-edge member 77 and bearing block 84 in either direction is prevented, the remainder of the boundary of the notch or groove 90 in the knife edge being well clear of the swivel pin 86 so that little or no friction occurs when resisting such play. The notch or groove 90 may be conveniently of the approximate D shape shown in Fig. 11.

By the above described arrangement of the pin 86 any tendency for the bearing block 84 to fall over, such as would arise if it were located below the knife edge line, is avoided.

The embracing stirrup 87 is fixedly mounted upon or formed integral with a vertical pin 91 located centrally of the block 84 in both directions and journalled in a fixed supporting part 92 in such manner that the bearing block and stirrup can be partially rotated with the pin 91 in its journal to come into alignment with the knife edge to be supported. If necessary the pin 91 may be locked in its journal by means of a nut 93 when alignment has been achieved.

When two or more knife edges and bearings are used in co-axial alignment with one another and in conjunction with the same lever, the required lateral location will be afforded by the use of one knife and block constructed as above described, the remaining bearings being constructed to be self-aligning as shown in Fig. 8 in which the swivel pivot is formed by two axially aligned pins 94 inserted in stopped holes in the block 84, or the pin may be otherwise shaped so as not to form an interruption across the V-groove in the block and the lines of contact of the knives and bearings can then remain continuous.

In some cases it may be desired to register the weight recorded by the above described weight integrating and totalising apparatus, at a distance, and in accordance with the invention this may be done electrically by providing a commutator geared to the weight recorder which will make and break an electric circuit to generate impulses for energising any well known form of rotary electric impulse recorder. Again when a predetermined amount has been weighed, an electric impulse made by the same means may be utilised to stop, start or vary the speed of any mechanism such as auxiliary motors, conveyors, crushers and the like, used in a variety of operations related to that of conveyance of the materials of which the weight is being integrated, totalised and recorded.

I claim:

1. Apparatus for automatically integrating the weight of materials being conveyed intermittently, comprising a movable weight responsive element, two rotating members, means for rotating the first of said members continuously at constant speed, a movable frictional transmission member driving the second of said rotatable members from the first with variable transmission ratio, an articulated parallelogram extending from above to below the two rotating elements, means for transmitting movements of the weight responsive element to the articulated parallelogram, means carried by the lower moving member of the articulated parallelogram and extending upwards therefrom into engagement with the movable frictional transmission member to impart displacements thereto, the extent of which are in substantially linear relationship with those of the weight responsive element, movable indicating means, differential gearing between the two rotating members and the indicating means, a clutch between the output end of the differential gearing and the indicator and means to operate said clutch to drive the indicator from the differential gearing for a pre-determined interval when a load arrives on the weight responsive element.

2. Apparatus for automatically integrating the weight of material being moved by a conveyor, comprising a movable weight responsive element, a friction gear including a parallel cylindrical roller and a conical roller journalled in spaced relationship with one another and a displaceable ball in frictional engagement with both said rollers to drive one from the other with variable transmission ratio, means for driving said other roller at a speed synchronized with that of the conveyor, an articulated parallelogram extending from above to below the friction gear and including a lower member adapted to move at all times parallel to itself, means for transmitting movements of the weight responsive element to the articulated parallelogram, a post rigidly mounted on the lower moving member of the articulated parallelogram, a pair of parallel discs mounted for rotation about their common axis at the upper end of said post and embracing the displaceable ball between them to impart displacements thereto the extent of which are in substantially linear relationship with those of the weight responsive element, movable indicating means and differential gearing coupling said parallel cylindrical and conical rollers and said indicating means.

3. Apparatus for automatically integrating the weight of materials being moved by a conveyor, comprising a movable weight responsive element, a friction gear including a parallel cylindrical roller and a conical roller journalled in spaced relationship with one another and a displaceable ball in frictional engagement with both said rollers to drive one from the other with variable transmission ratio, means for driving said other roller at a speed synchronized with that of the conveyor, an articulated parallelogram extending from above to below the friction gear and including a lower member adapted to move at all times parallel to itself, means for transmitting movements of the weight responsive element to the articulated parallelogram, a post rigidly mounted on the lower moving member of the articulated parallelogram so as to move at all times parallel to itself, a yoke pivotally mounted for movement about a horizontal axis at the upper end of said post, a pair of parallel discs mounted each on one limb of the yoke for rotation about their common axis and embracing the displaceable ball between them to impart displacements thereto the extent of which are in substantially linear relationship with those of the weight responsive element, movable indicating means and differential gearing coupling said parallel cylindrical and conical rollers and said indicating means.

4. Apparatus for automatically integrating the weight of materials being moved by a conveyor, comprising a movable weight responsive element, a friction gear including a parallel cylindrical roller disposed with its axis horizontal, a conical roller journalled in spaced relationship with respect to the cylindrical roller, a horizontally displaceable ball in frictional engagement with both said rollers to drive the conical roller from the cylindrical roller with variable transmission ratio, the conical roller being disposed so that the line of contact of the said ball therewith is horizontal and parallel with the line of contact of the ball with the cylindrical roller, means to rotate said cylindrical roller continuously at a speed synchronized with that of the conveyor, an articulated parallelogram extending from above to below the friction gear and including a lower member adapted to move at all times parallel to itself, means for transmitting movements of the weight responsive element to the articulated parallelogram, a post rigidly mounted on the lower moving member of the articulated parallelogram so as also to move at all times parallel to itself, a pair of parallel discs mounted for rotation about their common axis at the upper end of said post and embracing the displaceable ball between them to impart displacements thereto the extent of which are in substantially linear relationship with those of the weight responsive element, movable indicating means and differential gearing coupling said parallel cylindrical and conical rollers and said indicating means and differential gearing including a planet cage geared with the parallel cylindrical roller, a planetary system geared with the conical roller and an output sun wheel adapted to drive the indicating means.

SIDNEY CHARLES BROWN.

REFERENCES CITED

The following references are of record in the file of this patent:

UNITED STATES PATENTS

| Number | Name | Date |
| --- | --- | --- |
| 1,072,500 | Richardson | Sept. 9, 1913 |
| 2,029,271 | Messiter | Jan. 28, 1936 |
| 2,134,298 | Brown | Oct. 25, 1938 |
| 2,228,068 | White | Jan. 7, 1941 |

FOREIGN PATENTS

| Number | Country | Date |
| --- | --- | --- |
| 17,011 | Great Britain | of 1912 |